United States Patent [19]

Young et al.

[11] Patent Number: 4,835,745
[45] Date of Patent: May 30, 1989

[54] METHOD OF RADIAL SEISMIC DATA COLLECTION FOR IMPROVED SALT STRUCTURE IMAGING

[75] Inventors: Dewey R. Young, Houston; Richard E. Duren, Spring, both of Tex.

[73] Assignee: Exxon Production Research Company, Houston, Tex.

[21] Appl. No.: 199,518

[22] Filed: May 27, 1988

[51] Int. Cl.[4] ............................................. G01V 1/20
[52] U.S. Cl. ...................................................... 367/56
[58] Field of Search ...................... 367/56, 58, 53, 72; 181/111, 112

[56] References Cited

U.S. PATENT DOCUMENTS

| | | | |
|---|---|---|---|
| 3,731,270 | 5/1973 | Penhollow | 367/56 |
| 3,746,122 | 7/1973 | Davis | 367/56 |
| 3,931,609 | 1/1976 | Anstey | 367/72 |
| 4,486,863 | 12/1984 | French | 367/15 |
| 4,633,448 | 12/1986 | Koeijmans | 367/72 |
| 4,672,545 | 1/1987 | Lin et al. | 364/421 |
| 4,803,668 | 2/1989 | Berrylill et al. | 367/72 |

FOREIGN PATENT DOCUMENTS 3015869 11/1980 Fed. Rep. of Germany ........ 367/56

Primary Examiner—Thomas H. Tarcza
Assistant Examiner—Ian J. Lobo
Attorney, Agent, or Firm—Vaden, Eickenroht, Thompson & Boulware

[57] ABSTRACT

A detailed seismic survey is achieved when there is general knowledge of a formation with generally steep dip by first locating the central location point and then mapping radial shot lines and receiver lines therefrom. The shot lines need to extend across the dip and beyond. The receiver lines need to extend a normal distance as with conventional 3-D seismic surveys. Shots from the central location progressing outwardly will reflect first with equal incident and reflector paths, then with a short incident to long reflector path, and finally to where long incident and short reflector paths are achieved. The data collected radially to describe the formation is near one-tenth of that required for conventional 3-D surveys where the shot lines and the receiver lines are mapped in parallel survey lines.

3 Claims, 2 Drawing Sheets

METHOD OF RADIAL SEISMIC DATA COLLECTION FOR IMPROVED SALT STRUCTURE IMAGING

BACKGROUND OF THE INVENTION

1. Field of the Invention

This invention pertains to the collection of seismic data related to a generally known seismic formation having a significant dip from a central location. An example of specific geologic structure of interest is a salt dome structure.

2. Background of the Invention

Seismic data collection procedures in the prior art have normally been about the same for all types of geologic formations even though in many instances there is prior knowledge of the geologic formation about which more detailed knowledge is desired. Normally, general foreknowledge regarding the target is taken into account by the survey line spacing, the shotpoint spacing, and the receiver location spacing. When the formation is suspected of including rather steep dips, then the receiver locations are closer to one another and the survey lines will be drawn closer together than for a generally flat terrain.

Receiver spacing and survey line spacing are adjusted so as to avoid aliasing and to ensure that the seismic data migrates to its proper location. Steep dip leads to close spacing requirements.

The current procedure begins typically with mapping off an area containing the geologic formation to be explored. Parallel survey lines are established across the area. Some of these lines will be 'dip' lines while many more may often be 'strike' lines.

In addition to establishing survey lines, the area is also divided up into so-called rectilinear "bins", which are rectangular grid areas, into which collected data is assigned for subsequent data processing. When the survey lines, shotpoints, and receiver locations are such that a specified amount of data can be assigned to a particular bin, the data within that bin is deemed statistically valid. Shotpoints are positioned to provide quality data in the bins. When there is steep dip in the subsurface, there can be bins with little data assigned thereto if the survey lines, shotpoints, and receiver locations are too far apart. Hence, there is an additional need for close spacing. An enormous amount of data is normally collected and processed. Even for an area of just a few square miles, a large amount of data results for processing. Such data gathering and data processing effort is extremely expensive.

Shotpoints of a typical survey in the prior art are located at regular intervals, for example, every 15 meters even at a distance from the formation, which may be as great as five or more miles (approximately 8 Km). The mid-point reflection points are anticipated to be approximately halfway to the receiver locations on the survey line. For some surveys, receivers are simultaneously located on survey lines other than the ones coincident with the corresponding shotpoints. In the taking of the data, shots are initiated sequentially along a shotline while all the receivers simultaneously record seismic data. Because of the distances and directions involved to the geologic formation, much of the data will have relatively large amounts of noise along with the signals received off the target.

When a shotpoint and receiver location are on a survey line that crosses the dip along a "strike" line, a reflection from their common midpoint is directed off sideways at an angle. This can yield data with a poor signal-to-noise ratio. In addition, closely spaced survey lines are required so that this data remains unaliased when 3-D migration is applied to image the geologic structure. However, when the shotpoint and receiver locations are on a survey line that is also a dip line, the reflection returns to a receiver location on the survey line. This will be a stronger return providing useful data. If all the survey lines could be dip lines then migrating each of these radial 2-D lines negates the need for applying conventional 3-D migration that is required when conventional parallel survey lines are used.

Therefore, it is a feature of the present invention to capitalize upon previous knowledge concerning the symmetry of a geologic formation under investigation and to collect mostly meaningful data when it is known that steep dip is present and to coordinate radial collection with respect thereto.

It is another feature of the present invention to provide an improved method of seismic data collection with respect to suspected steep dip formations such that the 2-D seismic data is all shot along dip lines so that the collected data is higher quality compared with conventional methods.

It is another feature of this present invention to provide an improved seismic data collection procedure including establishing and migrating resulting 2-D radial lines in such a manner so as to eliminate the need for applying conventional 3-D migration.

SUMMARY OF THE INVENTION

From preliminary data it is assumed that the area to be surveyed in accordance with the present invention procedures has been found to include dip characteristics in more than one direction. Such preliminary data may be the result of collecting gravity data from the area, from magnetic data, from reconnaisence 2-D seismic, or the like. A formation for which the invention technique is particularly useful is a salt dome, which has relatively steep dips not only in two directions, but radially from a fairly central location. In any event, the central location is estimated and a shot line is drawn therethrough along the dip and passing over the dipping subsurface layers until they flatten out. Shotpoints are located along this shot line. Both up-dip and down-dip shooting is desired. Along this same line and continuing at a distance farther from the central location than the shot line, a receiver line is plotted in-line therewith and extending out quite some distance, in many cases, a distance of five miles (8 km) or more. Receivers are then spaced along this line.

Shots are initiated and the reflections recorded at the receivers. Near the central location, the incident and reflection paths meet at a relatively flat mid-point and the two path distances are nearly the same. As the dip begins to occur, then the reflection path will be longer than the corresponding incident path (assuming that the shooting is down dip). For example, a shotpoint can be directly over the dipping formation and reflect outwardly to a receiver quite some distance away. For other shotpoints, however, the incident lines and the reflection lines will become more equal in length. At some point, a shot can be initiated that is normal to the dip formation and be reflected directly back to a receiver at the same location. For a shotpoint even further distant from the central location than the last mentioned point, the in-line receiver location would even be inside of or closer to the central location than the shotpoint (assuming that the shooting is up dip). Reciprocity applies in this situation.

Such data reveals a great deal about the dip. Furthermore, the incident-and-reflector combined paths are typically shorter than for conventional surveys. The procedure just described yields stronger, less noisy signals and reduces the amount of non-useful data.

It is also evident that multiple receiver lines can be taken by providing receivers on additional receiver lines that are at a predetermined degree of rotation from the in-line receiver line. This is useful when collected data is to be 3-D migrated.

When receiver data has been collected for the shots located on the first shot line, then a new shot line is determined, also running through the central location, and one or more receiver lines are established with respect thereto in the same manner as for the first shot line. Then data is collected in the same manner. When there is a significant formation in all directions, then radial shot lines and receiver lines will be laid out for a complete circle.

BRIEF DESCRIPTION OF DRAWINGS

So that the manner in which the above-recited features, advantages and objects of the invention, as well as others which will become apparent, are attained and can be understood in detail, more particularly description of the invention briefly summarized above may be had by reference to the embodiment thereof that is illustrated in the drawings, which drawings form a part of the specification. It is to be noted, however, that the appended drawings illustrate only a preferred embodiment of the invention and are, therefore, not to be considered limiting of its scope for the invention may admit to other equally effective embodiments.

IN THE DRAWINGS

Figure 1:
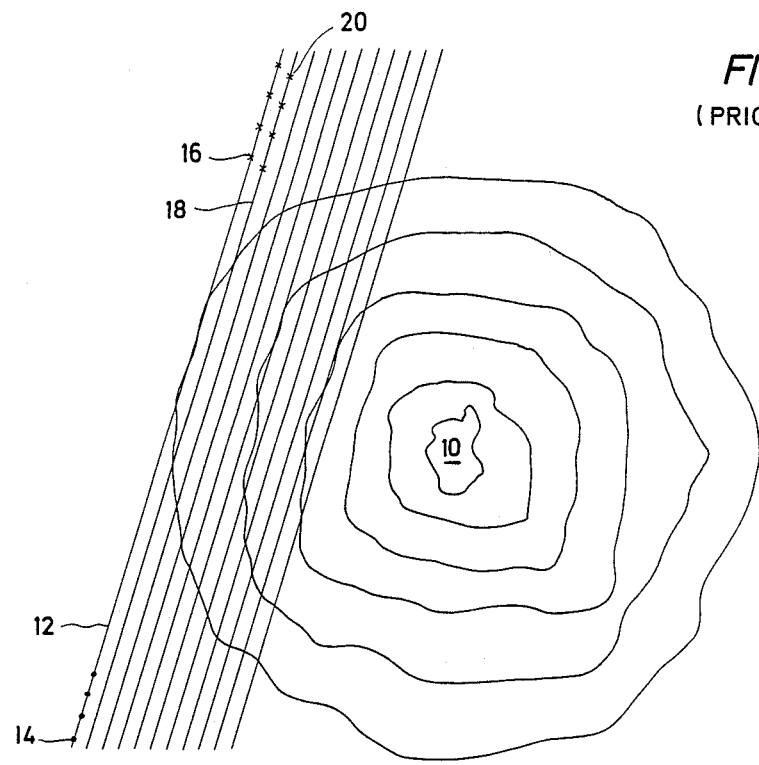

FIG. 1 is a plan view of a geological formation showing a salt dome with contour lines and illustrating conventional 3-D seismic survey shot and receiver lines.

Figure 2:
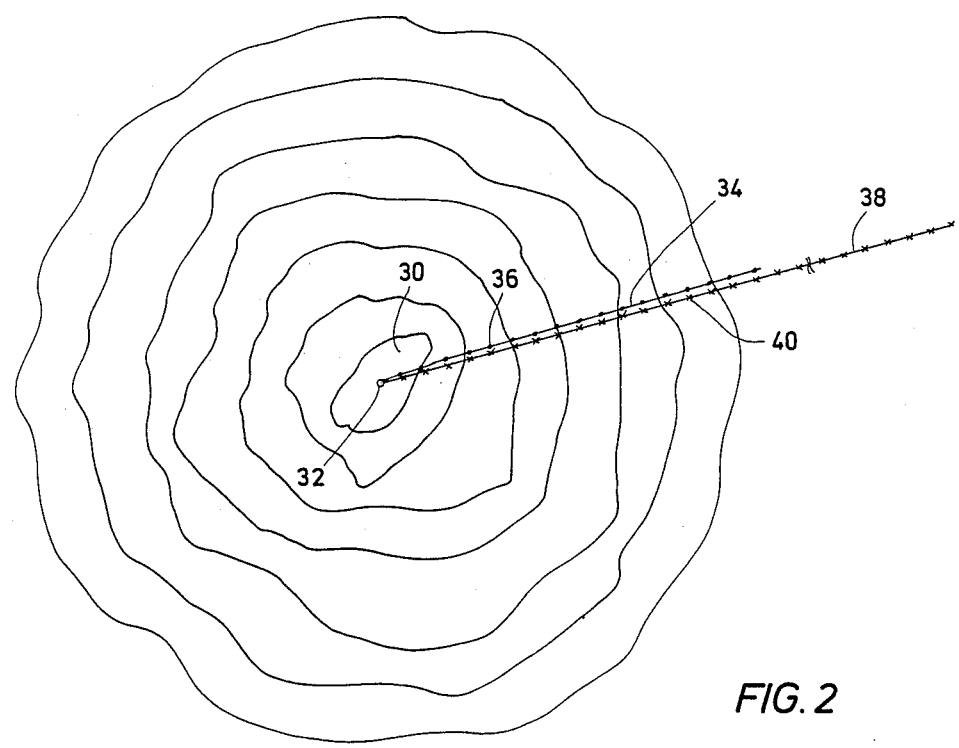

FIG. 2 is a plan view of a geological formation similar to that shown in FIG. 1 showing a salt dome with contour lines and illustrating radial seismic survey shot and receiver lines in accordance with the present invention.

Figure 3A:
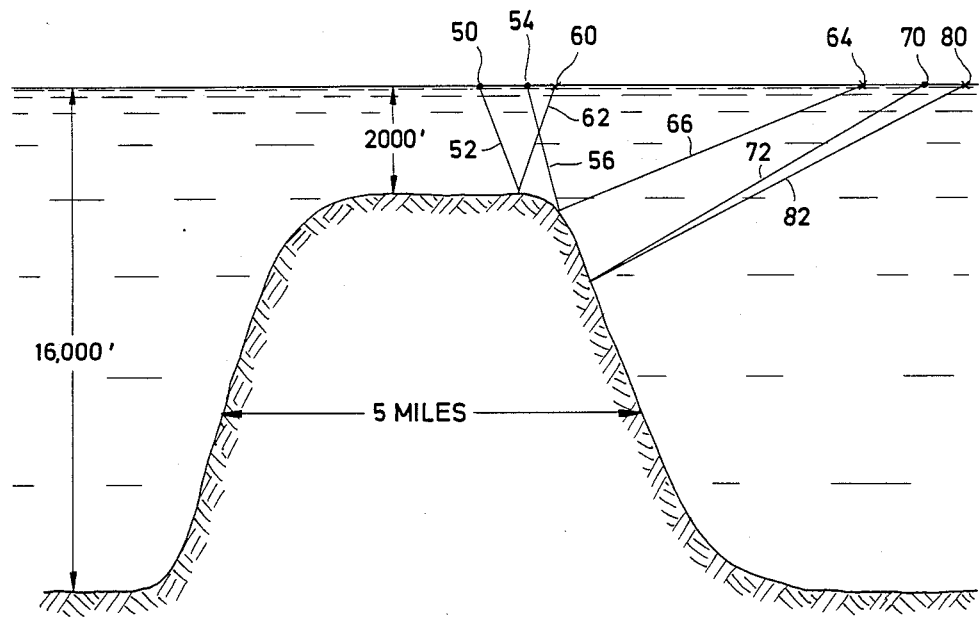
Figure 3B:
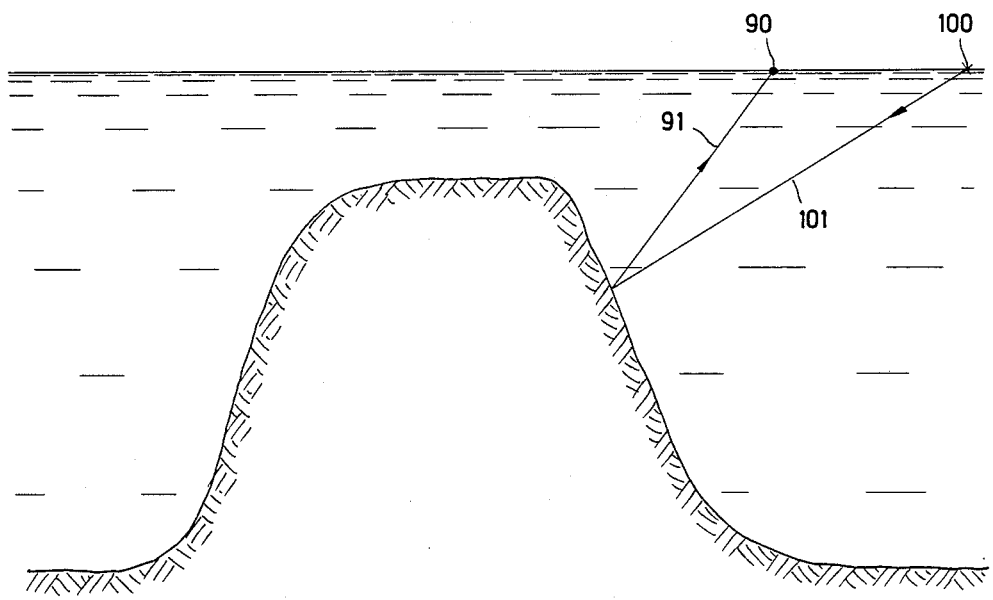

FIGS. 3A and 3B are cross-sectional side views of the geologic formation shown in FIG. 2 and illustrating example incident and reflection paths in accordance with the present invention.

DESCRIPTION OF THE PREFERRED EMBODIMENT

Now referring to the drawings and first to FIG. 1, a plan view of a geologic formation, including steep dip contours or flank lines, is shown making this formation suitable for surveying in accordance with the present invention. A salt dome is shown having a generally small peak area at about 2000 feet (840 meters) below the surface. Contour lines are drawn at every 2000 feet (840 meters), so it can be seen that there is a relatively steep dip in all directions from the peak location. The general location and appearance of the formation is assumed to be known or predetermined from data acquired previous to the instant survey. Because there is relatively steep dip present, survey lines 12 are drawn through the mapped area at relatively close spacing, for example, every 15 meters. Shot points 14 are then located, again at relatively close spacing intervals of 15 meters, along line 12. Receiver points 16 are laid out all along line 12 which can cover 5 miles (8 km) in length. The receivers are also sequentially spaced at about 15 meter intervals. If this is a 3-D survey, then additional receivers 20 can be located on adjacent line 18. Of course, only a very few receivers are shown.

The shots are sequentially or otherwise methodically initiated and the seismic reflections recorded at the receivers for subsequent data processing. The additional lines are utilized for subsequent shot and receiver employment and use in a manner similar to that described. In addition to the distances between shotpoints and receiver points, it is also significant that until the few lines are reached that pass over central area 10 are reached, most of the data being collected is along strike lines, which are generally parallel with the dip or flanks of the formation. Such data is notoriously hard to process and is difficult to collect in quantity without also collecting a great deal of data that is not useful in precisely determining the dip characteristics of the formation.

Now referring to FIG. 2, a dome formation is shown that is similar or identical to that shown in FIG. 1. Again, the general conformation of the formation is assumed to be known as a result of previously acquired data. However, the detailed structure is unknown. Peak area 30, the most shallow of the contoured area, is relatively small. A central location 32 is chosen for mapping the radial shot lines and receiver lines. It should be noted that the lines drawn therethrough in all directions will be dip lines. However, if the dip lines are merely on one side of the central point, the technique to be described is still valid.

The first shot line, shot line 34, is drawn through central location 32 and extending across and beyond the dip formation. Shotpoints 36 are located along shot line 34.

A receiver line 38 is then laid out coincident with shot line 34; however, receiver line 38 is extended to be much longer. Receiver points 40 are plotted that have an interval the same as for the shotpoints. Alternatively, shotpoints can be located on and between receiver points, if desired. It is assumed for the formation shown in FIG. 2 the end of the receiver line can be on the order of several miles from central location 32. A distance of seven to eight miles (approximately 11 to 13 km) would not be unusual.

Cross-sectional views of the FIG. 2 formation are shown in FIGS. 3A and 3B. In these views, it will be seen that the top area of the salt dome is approximately 2000 feet (840 meters) below the surface and the sides thereof are quite steep, dipping to a level of about 16,000 feet (6720 meters). The dome formation is assumed to be approximately five miles across. A shotpoint 50 that is located near the central location for the formation initiates a seismic signal that reflects from the top interface of the dome to be received at a receiver point 60. Such a shot produces an incident path 52 that is substantially equal in length to reflection path 62. A shotpoint 54 further from the central location than shotpoint 50 that is over the dip of the formation results in an incident path 56 that reflects from the flank interface to be received at receiver point 64. Reflection path 66 thereto is seen to be much longer than path 56, clearly showing that a dip in the formation is acting as the reflecting surface. A shotpoint 70 even further from the central location than shotpoint 60 produces an incident wave along path 72 to the dip surface that is substantially normal thereto. Such an incident wave results in a reflection along path 82 to be received at receiver 80, located in the same vicinity as the shotpoint. Such a result is an indication that shotpoint 70 is clearly outside of the limits of the formation dip. It will be seen that not only is the formation data more readily descriptive of the formation, on average there is more useful energy from the shots directed to the targets than with the conventional 3-D survey previously described. As the shotpoints move farther away from the target structure, the receiving points will begin to approach the structure. This is illustrated in FIG. 3B where a shot at point 100 some distance from the structure produces an incident wave along path 101 that results in a reflection along path 91 that is received at receiver 90, which is in the near vicinity of the structure.

Referring back to FIG. 2, a typical receiver line may include 240 receivers. A radial survey using a line rotation of one degree and having 795 shotpoints per line (7½ mile or 10 km long line), results in 69,000,000 total traces to be processed. Assuming the same shot and receiver intervals and spacing between lines for a FIG. 1 type survey, there are approximately 600,000,000 total traces to be processed. A rotation of one degree between radial lines reduces the number of traces to be processed to near one-tenth of that for the FIG. 1 survey, resulting in the saving of millions of dollars in processing costs. It is further believed that corrections for velocity changes are not as critical with the radial survey.

While a preferred embodiment of the invention has been shown and described, and modifications or alternatives have been discussed, it will be understood that the invention is not limited thereto since modifications can be made and will become apparent to those skilled in the art.

What is claimed is:

1. Process of collecting seismic data with respect to a generally known seismic formation having dip in at least two adjacent directions from a central location, comprising:

locating a first line of shotpoints radially passing over the first dip and passing through the central location, locating a first line of receiver points in line with said first line of shotpoints, said receiver points extending radially beyond said shotpoints, systematically shooting the first line of shotpoints and recording the seismic reflections at said first line of receiver points, locating a second line of shotpoints radially passing over the second dip and passing through the central location, locating a second line of receiver points radially passing through the central location and in line with said second line of shotpoints, systematically shooting the second line of shotpoints and recording the seismic reflections at said second line of receiver points, and subsequently locating lines of shotpoints, locating lines of receiver points, shooting said subsequent lines of shotpoints, and recording seismic reflections at said subsequent lines of receiver points until reflection data is received for all of the seismic formation having dip.

2. Process of collecting seismic data in accordance with claim 1, wherein said first and second and subsequent shotpoint and receiver lines are separated by small rotation angles of approximately one degree.

3. Process of collecting seismic data with respect to a generally known formation having dip in at least two adjacent directions from a central location, comprising:

locating a first line of shotpoints radially passing over the first dip and passing through the central location, locating a first line of receiver points radially passing through the central location and in line with said first line of shotpoints, said receiver points extending radially beyond said shotpoints, systematically shooting the first line of shotpoints and recording the seismic reflections at said first line of receiver points, locating a second line of receiver points radially passing through the central location at a small degree of rotation of approximately one degree from said first line of receiver points, systematically shooting the first line of shotpoints and recording the seismic reflections at said second line of receiver points, locating a second line of shotpoints radially passing over the second dip and passing through the central location, locating a third line of receiver points radially passing through the central location and in line with said second line of shotpoints, systematically shooting the second line of shotpoints and recording the seismic reflections at said third line of receiver points, locating a fourth line of receiver points passing through the central location at a small degree of rotation of approximately one degree from said third line of receiver points, systematically shooting the second line of shotpoints and recording the seismic reflections at said fourth line of receiver points, subsequently locating lines of shotpoints, locating lines of receiver points, shooting said subsequent lines of shotpoints, recording seismic reflections at said subsequent lines of receiver points, and locating lines of receiver points at small degrees of rotation respectively of approximately one degree and again shooting said subsequent lines of shotpoints while recording seismic reflections at the rotated lines of receiver points until reflection data is received for all of the seismic formation having dip.

* * * * *